United States Patent [19]

Hein

[11] Patent Number: 5,471,101
[45] Date of Patent: Nov. 28, 1995

[54] HIGH EFFICIENCY ELECTRICAL MACHINE WITH MINIMIZED MATERIAL CONTENT

[75] Inventor: Bruce T. Hein, Lexington, Tenn.

[73] Assignee: MagneTek Century Electric, Inc., St. Louis, Mo.

[21] Appl. No.: 156,276

[22] Filed: Nov. 22, 1993

[51] Int. Cl.$^6$ .............................. H02K 1/06; H02K 15/02
[52] U.S. Cl. ............................ 310/42; 310/166; 310/254; 310/216
[58] Field of Search .................... 310/42, 166, 40 R, 310/216, 254, 256; 29/596

[56] References Cited

U.S. PATENT DOCUMENTS 4,755,702  7/1988  Iijima et al. ............................ 310/166

Primary Examiner—Steven L. Stephan
Assistant Examiner—Judson H. Jones
Attorney, Agent, or Firm—Seldon & Scillieri

[57] ABSTRACT

An improved method is provided for the design of high-efficiency electric machines. The maximum practical value of air gap flux density $B_g$ is selected, consistent with maintaining acceptable noise and vibration levels. The value of $B_g$ selected is then used to determine the dimensions of the stator and rotor laminations so as to result in flux density levels that minimize core loss, stator $I^2R$ and rotor $I^2R$ losses, and magnetizing current requirements.

5 Claims, 2 Drawing Sheets

FIG. 1A
PRIOR ART METHOD
HIGH AIR GAP FLUX DENSITY DESIGN METHOD
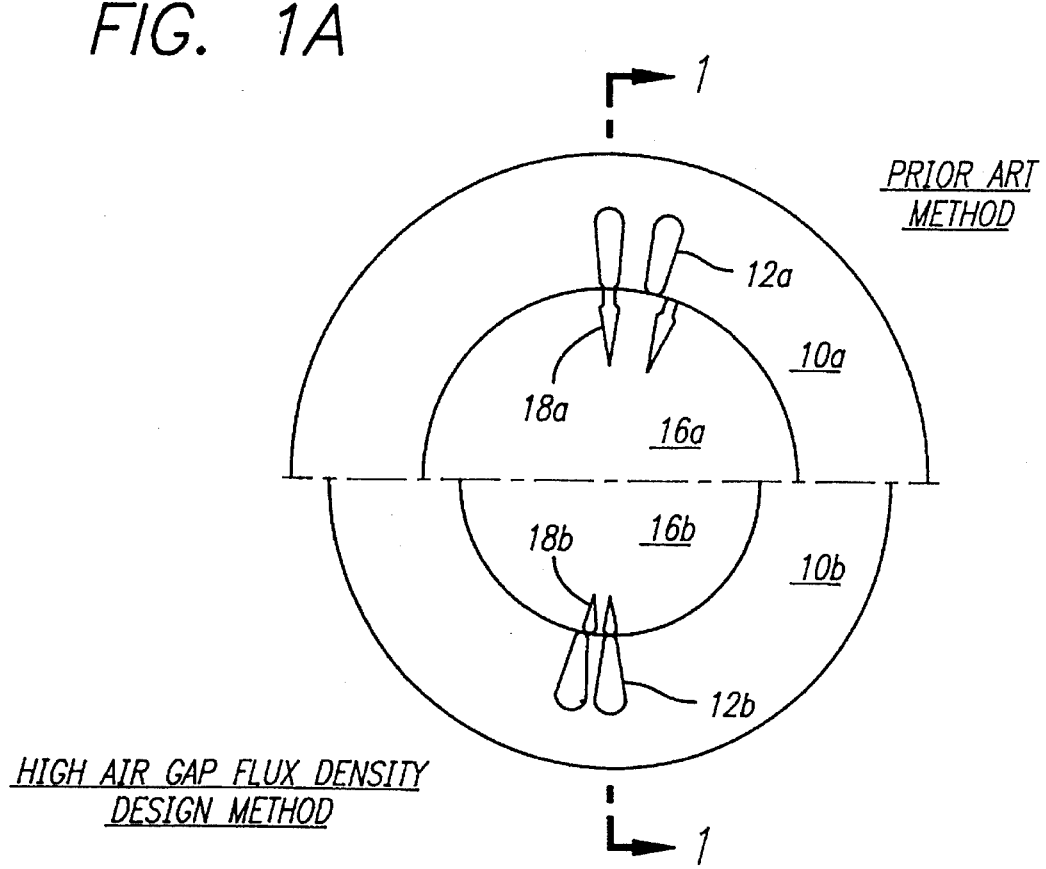
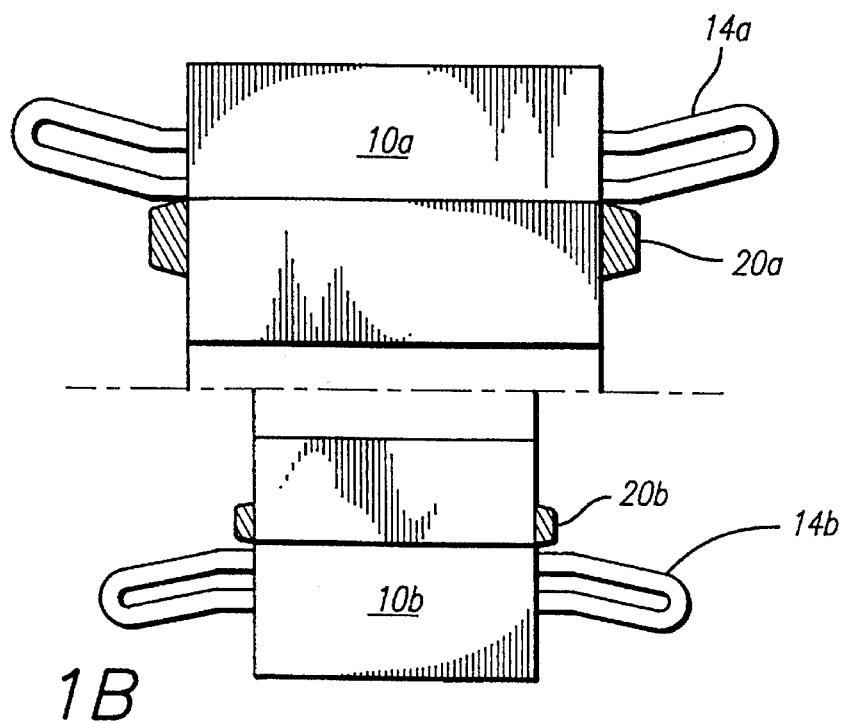
FIG. 1B

HIGH EFFICIENCY ELECTRICAL MACHINE WITH MINIMIZED MATERIAL CONTENT

BACKGROUND OF THE INVENTION

1. Technical Field

The present invention relates generally to the field of electric machines, e.g., motors and generators, and in particular to methods used to design high-efficiency electric machines.

2. Background Art

High efficiency has been a long-standing objective in the design and manufacture of electric machines. The prior art teaches that high efficiency is achieved by maximizing the amount of lamination material in the rotor and stator and then maximizing the amount of conductor wound onto the lamination material. Reactance is adjusted by increasing the number of series turns per coil in the winding.

The method used in the prior art necessarily results in greater costs. First, electric machines designed in this way necessarily require greater expenditures for lamination and winding material, as more is used. Further, using the maximum amount of winding material results in windings that are less adaptable to machine winding, thereby leading to increased labor costs.

The market for high-efficiency electric machines is competitive, and the savings of even a few cents per unit can be significant. There is thus a need in the art for a design method that minimizes material content.

SUMMARY OF INVENTION

The present invention provides an improved method for the design of high-efficiency electric machines. In a preferred embodiment of a method according to the present invention, the maximum practical value of air gap flux density $B_g$ is selected, consistent with maintaining acceptable noise and vibration levels. The value of $B_g$ selected is then used to determine the dimensions of the stator and rotor laminations so as to result in flux density levels that minimize core losses and magnetizing current requirements.

BRIEF DESCRIPTION OF THE DRAWINGS

FIG. 1A shows a composite front view of a rotor and stator assembly, juxtaposing the upper half of a stator and rotor designed according to the prior art with the lower half of a stator and rotor designed according to a preferred embodiment of the present invention. FIG. 1B shows a cross section of the composite stator and rotor assembly taken through the plane 1-1.

DESCRIPTION OF SPECIFIC EMBODIMENTS

FIG. 1A shows a composite front view of a stator and rotor assembly, juxtaposing the upper half of a stator and rotor designed according to the prior art and the lower half of a stator and rotor designed according to a preferred embodiment of a high air gap flux density design method according to the present invention. The particular stator and rotor shown are used in 10 HP 1800 RPM induction machines. FIG. 1B shows a cross section of the stator and rotor assembly taken through the plane 1-1.

As shown in FIGS. 1A and 1B, the stator $10a$, $10b$ comprises a hollow cylindrical body. The stator body is made up of a number of laminations, manufactured using materials and methods known in the art, and includes a set of slots $12a$, $12b$, regularly spaced along its inner circumference, to receive coils of winding material $14a$, $14b$, such as copper wire, or other conductor. The portion of the coils extending beyond either end of the stator body includes a straight section immediately proximate to the end of the stator body and a flared section extending from the distal end of the straight section to the nose of the coils.

As further shown in FIGS. 1A and 1B, the rotor $16a$, $16b$ comprises a cylindrical body fitting closely within the stator body, separated by an air gap. The rotor core is made up of a number of laminations, manufactured using materials and methods known in the art, and includes a set of slots $18a$, $18b$ along its outer circumference. The rotor includes end rings $20a$, $20b$ extending beyond either end of the rotor body.

Figure 2:
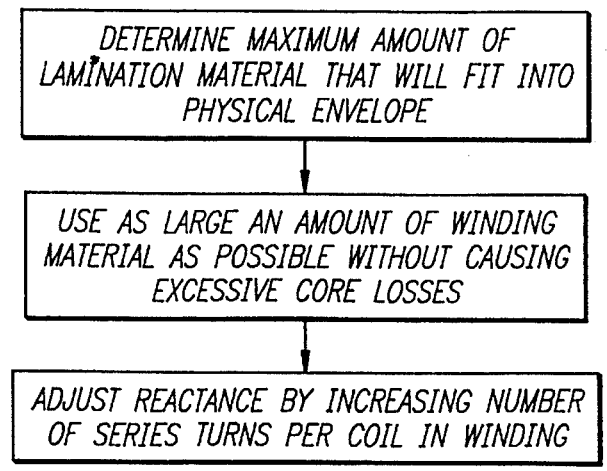
FIG. 2 shows a block diagram of a method according to the prior art for designing high-efficiency electric machines.

FIG. 2 shows a block diagram of a design method according to the prior art for maximizing the efficiency of an electric machine. The first step 22 is to determine the maximum amount of lamination material that will fit into the available physical envelope. The second step 24 is to use as large an amount of winding material as possible, without causing excessive core losses. Finally, in the third step 26, the reactance of the machine is adjusted by increasing the number of series turns per coil in the winding, in order to limit inrush currents to acceptance levels.

As is apparent from FIG. 2, the prior art method is premised on the assumption that the design of a highly efficient motor must begin with maximizing the amount of lamination and winding material used. Undesirable characteristics of the machine, such as reactance, are adjusted only after the amount of lamination and winding material used has been maximized.

The prior art approach thus necessarily leads to greater expenditures for materials. Further, maximizing the amount of winding material used and increasing the number of series turns per coil leads to windings that are less adaptable to machine winding, thereby resulting in increased labor costs.

The present invention provides a design method for high-efficiency electric machines that minimizes the amount of lamination and winding material used by maximizing the air gap flux density $B_g$. As is apparent from FIGS. 1A and 1B, use of the high air gap flux density design method results in an electric machine significantly smaller than a machine of comparable efficiency designed according to the prior art.

The present invention is based on the following relationships in electric machines, which generally apply to both motors and generators, with minor changes (for example, in a generator, kilowatts are used instead of horsepower):

(1) OUTPUT TORQUE $$T_{MAX} = \frac{c_1}{X}$$

where $T_{MAX}$=Maximum output torque (basis of machine rating), usually expressed as a percentage of the full load torque $X$=Total leakage reactance under running conditions, calculated in section (2), below and where $C_1$ is a constant that is computed as follows:

$$C_1 = \frac{.0476 \cdot m\, E_\psi^2}{HP}$$

where $m$=Number of phases in the winding (usually three)
$E_\psi$=Voltage per phase
$HP$=Horsepower rating for motors These relationships can be used to calculate the maximum output torque $T_{MAX}$ of the induction machine shown in FIG. 1B, in which $m=3$, $E_\psi=265$, $HP=10$, and, as shown below in section (2), $X=2.871$. These values yield $C_1=1002.8$, and $T_{MAX}=349\%$.

(2) LEAKAGE REACTANCE $$X = C_2 \cdot N^2(C_3 L + C_4)$$

where $N$=Number of series turns per coil in the winding
$L$=Axial length of the laminations
$C_2$ is a constant, computed as follows:

$$C_2 = \frac{4 \cdot Q_1^2 \times f}{a^2 \times 10^8}$$

where $Q_1$=Number of stator slots
$f$=Frequency of the voltage supply
$a$=Number of parallel circuits used in the stator winding
$C_3$ is a constant, computed as follows:

$$C_3 = \left[\frac{20}{m \cdot Q_1}({}_TK_S \cdot {}_TK_X + {}_AK_S \cdot {}_AK_X)\right] +$$

$$\left[\frac{20}{m \cdot Q_2}(K_C \cdot K_D)^2 \times 2\, K_S \atop (RUN)\right] +$$

$$\left[\frac{17 \cdot {}_1D_i \cdot {}_AK_x}{m \cdot Q_1(Q_1+Q_2)\, g_{eg}} \left(1 + \frac{\sin\left(\frac{180 \cdot p \cdot Q_{sk}}{2Q_2}\right)}{\frac{180 \cdot p \cdot Q_{sk}}{2Q_2}}\right)\right]$$

where $m$=Number of phases in the winding, usually three
$Q_1$=Number of stator slots
${}_TK_S$=A geometric factor for the body section of the stator slot
${}_TK_X$=A reactance chord factor for that part of the slot above the coil; this factor is related to the percentage pitch used in the winding
${}_AK_S$=A geometric factor for the top section of the stator slot
${}_AK_X$=A reactance chord factor for that part of the slot where the winding lies; this factor is related to the percentage pitch used in the winding $Q_2$=Number of rotor slots
$K_C$=A factor related to the chording or percentage pitch of the winding
$K_D$=A factor related to the distribution of the winding in terms of slots per pole
${}_2K_S/(RUN)$=A geometric factor for the body section of the rotor slot under running conditions
${}_1D_i$=Inside diameter of the stator
$g_{eq}$=Equivalent length of the air gap between the stator and rotor
$P$=Number of poles that the machine is wound for
$Q_{SK}$=Number of slots skewed as a fraction of a stator slot pitch $C_4$ is a constant, computed as follows:

$$C_4 = \frac{4(K_C \cdot K_D)^2}{m \cdot p}\left[(2C+Z) + \frac{4 \cdot 52 D_0(b_{er}+h_1)}{p(3 \cdot 4a_{er}+3 \cdot 8b_{er}+1 \cdot 4h_1)}\right]$$

where $C$=Straight portion of winding coil extension
$Z$=Axial end coil distance from the end of the straight portion of the coil to the nose of the coil
${}_2D_o$=Outside diameter of the rotor
$b_{er}$=Depth of rotor end ring
$h_1$=Depth of stator slot
$a_{er}$=Width of rotor end ring The induction machine shown in FIG. 1B displays the following values for these parameters:

| | | | |
|---|---|---|---|
| $N =$ | 26 | ${}_2K_S =$ (RUN) | 1.914 |
| $L =$ | 3.75 | | |
| $Q_1 =$ | 36 | ${}_1D_i =$ | 4.770 |
| $f =$ | 60 | $g_{eq} =$ | .0183 |
| $a =$ | 2 | $p =$ | 4 |
| $m =$ | 3 | $Q_{SK} =$ | 1.2 |
| ${}_TK_S =$ | 1.80 | $C =$ | .25 |
| ${}_TK_X =$ | .937 | $Z =$ | 1.614 |
| ${}_AK_S =$ | .714 | ${}_2D_o =$ | 4.740 |
| ${}_AK_X =$ | .915 | $b_{er} =$ | 1.340 |
| $Q_2 =$ | 44 | $h_1 =$ | .734 |
| $K_C =$ | .985 | $a_{er} =$ | .370 |
| $K_D =$ | .960 | | |

Using these values in the above equations yields the following results: $C_2=7.776\times 10^{-4}$, $C_3=1.169$, $C_4=1.077$, and $X=2.871$.

(3) RESISTANCE (PER PHASE)

$$R = \frac{C_5 \cdot N(L+C_6)}{A_X}$$

where $A_x$=Cross sectional area of a single series turn in the winding and where $C_5$ and $C_6$ are constants, determined as follows:

$$C_5 = 1.384 \frac{Q_1}{m \cdot a^2} \times 10^{-6}$$

$$C_6 = L_{EC}$$

Applying these equations to the induction machine shown in FIG. 1B, in which

| | | | |
|---|---|---|---|
| N = | 26 | m = | 3 |
| L = | 3.75 | a = | 2 |
| $A_x$ = | .001608 | $L_{EC}$ = | 5.93 |
| $Q_1$ = | 36 | | | yields the following results: $C_5 = 4.152 \times 10^{-6}$, $C_6 = 5.93$, and $R = 0.649$

(4) AIR GAP FLUX DENSITY $$B_g = \frac{C_7}{N \cdot L}$$

where $C_7$ is a constant computed using the following formula:

$$C_7 = \cdot 104 \frac{p \cdot E_\psi \cdot m \cdot a}{{}_1 D_i \cdot f \cdot Q_1 \cdot K_C \cdot K_D} \times 10^8$$

Using the values previously given as the parameters for the induction machine shown in FIG. 1B, $C_7$ is calculated to be $0.0679 \times 10^8$, and $B_g$ is calculated to be 69,640.

(5) WEIGHT OF WINDING MATERIAL $$WT = C_8 \cdot N \cdot A_x (L + C_6)$$

where

WT=Winding weight and where $C_8$ and $C_6$ are constants, calculated as follows:

$$C_8 = 0.650 \, Q_1$$

$$C_6 = L_{EC}$$

Applying these equations to the values previously given for the parameters of the induction machine shown in FIG. 1B, $C_6$ is 5.93, $C_8$ is calculated to be 23.4, and WT is calculated to be 9.47.

The above relationships for output torque, leakage reactance, resistance, and weight of winding material can be restated as follows to show their relationship to air gap flux density ($B_g$):

(6) OUTPUT TORQUE $$T_{MAX} = \frac{(B_g L)^2}{C_9 (C_3 L + C_4)}$$

where $C_9$ is a constant, calculated as follows:

$$C_9 = \frac{C_{10}}{C_1}$$

Applying these relationships to the values previously given for the parameters of the induction machine shown in FIG. 1B, $C_9$ is calculated to be $35.75 \times 10^6$, and $T_{MAX}$ is calculated to be 349.9% (as compared with 349% obtained above using the relationships set forth in section (1).

Further, using the restated relationships, it can be shown that where a $B_g$ of 40,000 is used instead of 69,700, then L is calculated to be 9.98, as compared with an L of 3.75 for a $B_g$ of 69,640.

(7) LEAKAGE REACTANCE $$X = \frac{C_{10}(C_3 L + C_4)}{(B_g L)^2}$$

where $C_{10}$ is a constant, determined by the following formula:

$$C_{10} = C_2 \cdot C_7^2$$

Applying these relationships to the values previously given for the parameters of the induction machine shown in FIG. 1B, $C_{10}$ is calculated to be $3.585 \times 10^{10}$, and X is calculated to be 2.866 (as compared with 2.871, arrived at using the relationships set forth above in section (2).

Using the restated relationships, it can be shown that where a $B_g$ of 40,000 is used, L becomes 9.98.

(8) RESISTANCE (PER PHASE)

$$R = \frac{C_{11}\left(1 + \frac{C_6}{L}\right)}{B_g \cdot A_x}$$

where $C_{11}$ is a constant, calculated as follows:

$$C_{11} = C_5 \cdot C_7$$

Applying these relationships to the values previously given for the parameters of the induction machine shown in FIG. 1B, $C_{11}$ is calculated to be 28.19, and R is calculated to be 0.649 (the same value arrived at using the relationships set forth above in section 15D).

Using the restated relationships, it can be shown that where a $B_g$ of 40,000 is used, L becomes 7.78.

(9) WEIGHT OF WINDING MATERIAL $$WT = C_{12} \cdot \frac{A_x}{B_g}\left(1 + \frac{C_6}{L}\right)$$

where $C_{12}$ is constant, calculated as follows:

$$C_{12} = C_7 \cdot C_8$$

Applying these relationships to the values previously given for the parameters of the induction machine shown in FIG. 1B, $C_{12}$ is calculated to be $1.589 \times 10^8$, and WT is calculated to be 9.46 (as compared with 9.47, arrived at using the prior art relationships).

Using the restated relationships, where a $B_g$ of 40,000 is used, L becomes 7.78, and WT becomes 13.40.

Thus, from the above equations, it follows that as the air gap magnetic flux $B_g$ increases, the following desirable results can be obtained: First, $T_{MAX}$, the output torque, can be achieved with a lower value for L, the axial length of the laminations. Second, a specific value of X, the total leakage reactance under running conditions, can be achieved with a lower value for L. Third, a lower value of R, the resistance of the winding, can be obtained for a specific value of $A_x$, the cross sectional area of a single series turn in the winding. Finally, a lower value of WT, the winding weight, can be obtained for a specific value of $A_x$. It thus appears that it is possible to achieve equal or greater efficiency in an electric machine with less lamination and winding material, by maximizing the air gap magnetic flux $B_g$.

Figure 3:
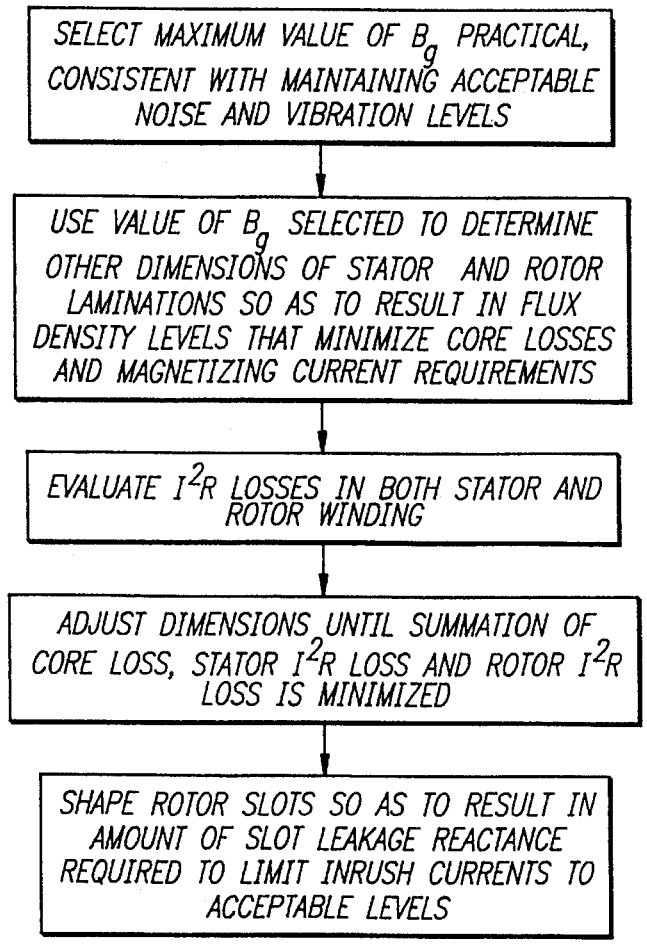
FIG. 3 shows a block diagram of a preferred embodiment of a high air gap flux density design method according to the present invention for designing high-efficiency electric machines.

FIG. 3 shows a block diagram of a preferred embodiment of a method according to the present invention. In the first step 28, a maximum value of the air gap magnetic flux $B_g$ is selected, consistent with maintaining acceptable noise and vibration levels. It is this maximum value for $B_g$ that provides the basis for the design of the machine.

In the second step 30, the value of $B_g$ selected is used to determine the other dimensions of the stator and rotor laminations so as to result in flux density levels that minimize core losses and magnetizing current requirements.

The determination of the other dimensions also requires evaluating $I^2R$ losses in both the stator and rotor windings, with adjustments being made until the summation of the core loss, stator $I^2R$ loss and rotor $I^2R$ loss is minimized. This is carried out in the third and fourth steps 32, 34.

The final step 36 is to shape the rotor slots so as to result in the amount of slot leakage reactance required to limit inrush currents to acceptable levels and/or levels mandated by industry standards.

Typically, electric machines designed using the high air gap flux density design method will have air gap flux densities in the range of 55–75 KL/in². Those designed using prior art methods will typically have air gap flux densities in the range of 35–50 KL/in².

While the foregoing description includes detail which will enable those skilled in the art to practice the invention, it should be recognized that the description is illustrative in nature and that many modifications and variations will be apparent to those skilled in the art having the benefit of these teachings. It is accordingly intended that the invention herein be defined solely by the claims appended hereto and that the claims be interpreted as broadly as permitted in light of the prior art.

I claim:

1. An electrical machine having minimized material content, comprising a laminated stator and rotor with the laminations designed by:

(a) selecting the maximum practical value of air gap flux density $B_g$ consistent with maintaining acceptable noise and vibration levels;

(b) using the value of $B_g$ selected to determine the dimensions of the stator and rotor laminations so as to result in flux density levels that minimize core losses and magnetizing current requirements.

2. An electrical machine according to claim 1, wherein the dimensions of the stator and rotor laminations are determined by applying the relationship:

$$B_g = \frac{C_7}{N \cdot L}$$

where N is the number of series turns per coil in the winding, L is the axial length of the laminations, and C is a constant, computed using the following formula:

$$C_7 = \cdot 104 \frac{p \cdot E_\psi \cdot m \cdot a}{{}_1D_i \cdot f \cdot Q_1 \cdot K_C \cdot K_D} \times 10^8$$

where p=the number of poles the machine is wound for;

$E_\psi$=the voltage per phase;

m=the number of phases in the winding;

a=the number of parallel circuits used in the stator winding;

${}_1D_i$=the inside diameter of the stator;

f=the frequency of the voltage supply;

$Q_1$=the number of rotor slots;

$K_c$=a factor related to the chording of the winding; and $K_D$=a factor related to the distribution of the winding in terms of slots per pole.

3. An electrical machine according to claim 2, wherein the dimensions of the stator and rotor laminations are further determined by evaluating $I^2R$ losses in both the stator and rotor windings and adjusting the dimensions of the stator and rotor laminations and the windings until the summation of the core loss, stator $I^2R$ loss and rotor $I^2R$ loss is minimized.

4. An electrical machine according to claim 3 wherein the rotor slots are shaped so as to result in the amount of slot leakage reactance required to limit inrush currents.

5. An electrical machine having minimized material content, comprising a laminated stator and rotor with the laminations designed by:

(a) selecting as an initial parameter the maximum practical value of air gap flux density consistent with maintaining acceptable noise and vibration levels;

(b) selecting dimensions for the stator and rotor laminations based upon the selected value of air gap flux density;

(c) evaluating $I^2R$ loss in the stator winding;

(d) evaluating $I^2R$ loss in the rotor winding;

(e) evaluating core loss in the stator and rotor laminations;

(f) adjusting the dimensions of the stator and rotor laminations and the stator and rotor windings until the summation of the core loss, stator $I^2R$ loss and rotor $I^2R$ loss is minimized; and (g) shaping the rotor slots so as to result in the amount of slot leakage reactance required to limit inrush currents.

* * * * *